United States Patent
Sitarski

(10) Patent No.: US 9,517,715 B1
(45) Date of Patent: Dec. 13, 2016

(54) LIGHT DRIVER ARRANGEMENTS FOR VEHICLE HEADLAMPS

(71) Applicant: Toyota Motor Engineering & Manufacturing North America, Inc., Erlanger, KY (US)

(72) Inventor: Nicholas S. Sitarski, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/975,833

(22) Filed: Dec. 20, 2015

(51) Int. Cl.
*B60Q 1/00* (2006.01)
*B60Q 1/04* (2006.01)

(52) U.S. Cl.
CPC .............. *B60Q 1/0076* (2013.01); *B60Q 1/04* (2013.01)

(58) Field of Classification Search
None
See application file for complete search history.

(56) References Cited

U.S. PATENT DOCUMENTS 8,587,217 B2  11/2013  Melanson
2011/0210670 A1  9/2011  Sauerlander et al.

FOREIGN PATENT DOCUMENTS

WO  2009095194 A2  8/2009

*Primary Examiner* — Monica C King
(74) *Attorney, Agent, or Firm* — Christopher G. Darrow; Darrow Mustafa PC

(57) ABSTRACT

A vehicle headlamp system can include a plurality of low beam light sources and a plurality of high beam light sources. In one or more arrangements, the light sources can be light emitting diodes. The system can include a first light driver operatively connected to selectively supply electrical energy to a first group of low beam light sources and/or a first group of high beam light sources. The system can include a second light driver operatively connected to selectively supply electrical energy to a second group of low beam light sources and/or a second group of high beam light sources. The system can further include a controller. The controller can be operatively connected to the first light driver and the second light driver to control the selective supply of electrical energy by the first light driver and the second light driver.

20 Claims, 5 Drawing Sheets

400

```
┌─────────────────────────────────────────────┐
│   Receiving a signal to operate the vehicle  │
│   headlamp system in one of a low beam       │──── 410
│   operational mode or a high beam            │
│   operational mode                           │
└─────────────────────────────────────────────┘
                      │
                      ▼
┌─────────────────────────────────────────────┐
│   Responsive to the received signal being a  │
│   signal to operate the vehicle headlamp     │
│   system in the low beam operational mode,   │
│   causing electrical energy to be supplied   │
│   to a first group of low beam light sources │──── 420
│   while bypassing a first group of high      │
│   beam light sources and causing electrical  │
│   energy to be supplied to a second group of │
│   low beam light sources while bypassing a   │
│   second group of high beam light sources    │
└─────────────────────────────────────────────┘
                      │
                      ▼
┌─────────────────────────────────────────────┐
│   Responsive to the received signal being a  │
│   signal to operate the vehicle headlamp     │
│   system in the high beam operational mode,  │
│   causing electrical energy to be supplied   │
│   to the first group of low beam light       │──── 430
│   sources and the first group of high beam   │
│   light sources in series and causing        │
│   electrical energy to be supplied to the    │
│   second group of low beam light sources     │
│   and the second group of high beam light    │
│   sources in series                          │
└─────────────────────────────────────────────┘
```

FIG. 6

LIGHT DRIVER ARRANGEMENTS FOR VEHICLE HEADLAMPS

FIELD

The subject matter described herein relates in general to vehicles and, more particularly, to vehicle lighting.

BACKGROUND

Vehicles include various lighting systems. For instance, vehicles include a headlamp system to illuminate the road ahead for driver visibility. A headlamp system typically includes low beam headlamps and high beam headlamps. High beam headlamps direct most of their light straight ahead to maximize sight distance for a driver, but they produce too much glare for safe use when other vehicles are present on the road. Low beam headlamps direct most of their light downward and laterally to provide safe forward visibility while reducing glare for other drivers.

SUMMARY

In one respect, the present disclosure is directed to a vehicle lighting system. The system includes a plurality of low beam light sources. The plurality of low beam light sources includes a first group of low beam light sources and a second group of low beam light sources. The system includes a plurality of high beam light sources. The plurality of high beam light sources includes a first group of high beam light sources and a second group of high beam light sources. The system includes a first light driver. The first light driver can be operatively connected to the first group of low beam light sources and the first group of high beam light sources. The system includes a second light driver. The second light driver can be operatively connected to the second group of low beam light sources and a second group of high beam light sources. The system includes a controller. The controller can be operatively connected to the first light driver and the second light driver. The controller can be configured to cause the first light driver to selectively supply electrical energy to at least one of the first group of low beam light sources or the first group of high beam light sources. The controller can also be configured to cause the second light driver to selectively supply electrical energy to at least one of the second group of low beam light sources or the second group of high beam light sources.

In another respect, the present disclosure is directed to a vehicle headlamp system. The system includes a plurality of low beam light emitting diodes (LEDs) and a plurality of high beam LEDs. The plurality of low beam LEDs and the plurality of high beam LEDs can be a part of a light source for a single headlamp assembly. The system can include a first light driver and a second light driver. The first light driver and the second light driver can be configured to selectively supply electrical energy to power the low beam LEDs and the high beam LEDs in a commingled manner.

In still another respect, the present disclosure is directed to a method of operating a vehicle headlamp system. The vehicle headlamp system includes a plurality of low beam light sources and a plurality of high beam light sources. The method includes receiving a signal to operate the vehicle headlamp system in a low beam operational mode or a high beam operational mode. Responsive to the signal being a signal to operate the vehicle headlamp system in the low beam operational mode, the method includes causing, using a controller, a first light driver to supply electrical energy to a first group of low beam light sources while bypassing a first group of high beam light sources. In addition, the method includes causing, using the controller, a second light driver to supply electrical energy to a second group of low beam light sources while bypassing a second group of high beam light sources. Thus, in the low beam operational mode, the plurality of low beam light sources are activated, and the plurality of high beam light sources are not activated. Responsive to the signal being a signal to operate the vehicle headlamp system in the high beam operational mode, the method includes causing, using the controller, the first light driver to supply electrical energy to the first group of low beam light sources and the first group of high beam light sources in series. The method additionally includes causing, using the controller, the second light driver to supply electrical energy to the second group of low beam light sources and the second group of high beam light sources in series. Thus, in the high beam operational mode, the plurality of low beam light sources are activated, and the plurality of high beam light sources are activated.

BRIEF DESCRIPTION OF THE DRAWINGS

FIG. 6 is an example of a method of operating a vehicle headlamp.

DETAILED DESCRIPTION

Figure 1:
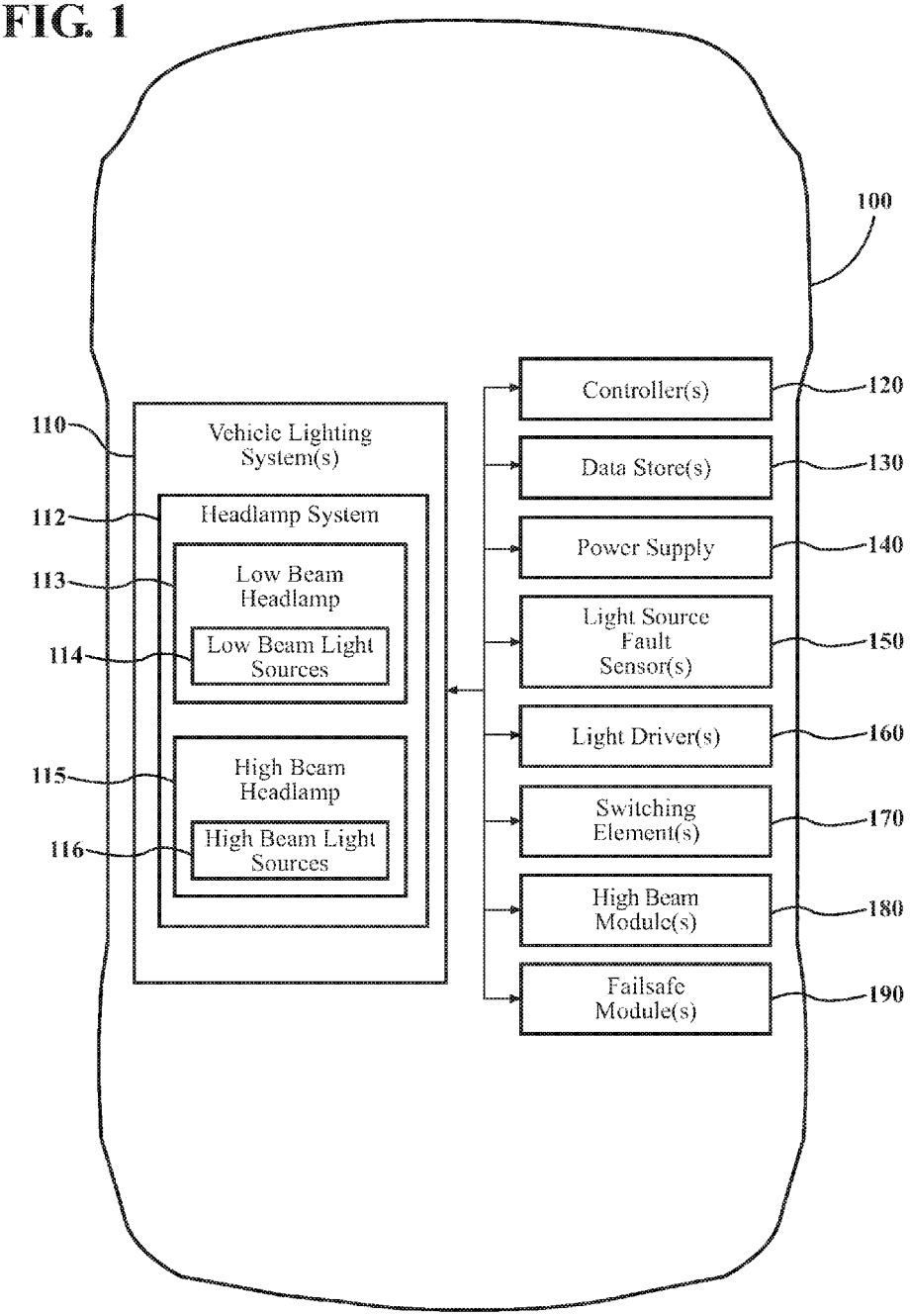
FIG. 1 is an example of a vehicle.

Light driver arrangements for vehicle lighting (e.g., headlamps) can be provided. A plurality of low beam light sources can include a first group of low beam light sources and a second group of low beam light sources. A plurality of high beam light sources can include a first group of high beam light sources and a second group of high beam light sources. A first light driver can be operatively connected to the first group of low beam light sources and the first group of high beam light sources. A second light driver can be operatively connected to the second group of low beam light sources and the second group of high beam light sources. The first light driver can be caused to selectively supply electrical energy to at least one of the first group of low beam light sources or the first group of high beam light sources. The second light driver can be caused to selectively supply electrical energy to at least one of the second group of low beam light sources or the second group of high beam light sources. The present detailed description relates to apparatus, methods, and/or systems that incorporate one or more of such features. Arrangements described herein can allow flexibility in the design and/or selection of the power output of vehicle headlamps while minimizing the quantity of light drivers used.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

The vehicle 100 can include various elements, some of which may be a part of a vehicle lighting system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle can include a one or more vehicle lighting systems 110. The one or more vehicle lighting systems 110 can emit light within the vehicle 100 and/or outside of the vehicle 100. As an example, the one or more vehicle lighting systems 110 can include a headlamp system 112. The headlamp system 112 can include a plurality of light sources that emit light in front of the vehicle 100. The plurality of light sources of the headlamp system 112 can be located at or near a front end of the vehicle 100. In one or more arrangements, the headlamp system 112 can include one or more light sources positioned at or near a left front portion of the vehicle 100 and one or more light sources positioned at or near a right front portion of the vehicle 100.

The plurality of light sources can generate or emit any type of light energy. The plurality of light sources can be powered by electrical energy. In one or more arrangements, the light sources can be light emitting diodes (LEDs). For instance, a plurality of LEDs can be provided as an array of LEDs. In one or more arrangements, the light sources can be organic LEDs, polymer LEDs, solid state lighting, LED lamps, and/or active-matrix organic LEDs. In one or more arrangements, one or more LEDs can be part of a chip (referred to as an LED chip) or may be part of some other suitable package. In some arrangements, the plurality of light sources can be the same type of light source. In other arrangements, the plurality of light sources can be different types of light sources.

The headlamp system 112 can include a low beam headlamp 113 and a high beam headlamp 115. The low beam headlamp 113 can include a plurality of low beam light sources 114. The high beam headlamp 115 can include a plurality of high beam light sources 116. The low beam headlamp 113 and the high beam headlamp 115 can have different light output characteristics. As an example, the low beam headlamp 113 can be configured to direct at least a majority of its light energy downwardly and laterally, and the high beam headlamp 115 can be configured to direct at least a majority of its light energy straight ahead.

The vehicle 100 can include one or more controllers 120. "Controller" means any component or group of components that are configured to execute any of the processes described herein or any form of instructions to carry out such processes or cause such processes to be performed. The controller(s) 120 may be implemented with one or more general-purpose and/or one or more special-purpose processors. Examples of suitable controllers include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a processor. The controller(s) 120 can include at least one hardware circuit (e.g., an integrated circuit) configured to carry out instructions contained in program code. In arrangements in which there is a plurality of controllers 120, such controllers can work independently from each other or one or more controllers can work in combination with each other. In one or more arrangements, the controller(s) 120 can be a lamp electronic control unit (ECU).

The vehicle 100 can include one or more data stores 130 for storing one or more types of data. The data store 130 can include volatile and/or non-volatile memory. Examples of suitable data stores 130 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 130 can be a component of the controller(s) 120, or the data store(s) 130 can be operatively connected to the controller(s) 120 for use thereby. The term "operatively connected," as used throughout this description, can include direct or indirect connections, including connections without direct physical contact.

The vehicle 100 can include one or more power supplies 140. The one or more power supplies 140 can be any suitable source of electrical power for the headlamp system 112. In one or more arrangements, the power supply 140 can include one or more batteries. Alternatively or in addition, the power supply 140 can include one or more engines and/or one or more generators. The one or more power supplies 140 can be operatively connected to supply and/or selectively supply electrical energy to the headlamp system 112.

The vehicle 100 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In one or more arrangements, the vehicle 100 can include one or more light source fault sensors 150. The light source fault sensor(s) 150 can be configured to detect, determine, assess, monitor, measure, quantify and/or sense information about one or more of the light sources. In one or more arrangements, the light source fault sensor(s) 150 can be configured to detect, determine, assess, monitor, measure, quantify and/or sense information about the plurality of low beam light sources 114. More particularly, the light source fault sensor(s) 150 can be configured to detect a fault with one or more of the low beam light sources 114. As used herein, "fault" includes not working as intended and/or within specification, defective, malfunctioning, inoperable and/or disabled. The light source fault sensor(s) 150 can be operatively connected to the controller(s) 120. The light source fault sensor(s) 150 can detect faults in any suitable manner. For example, the light source fault sensor(s) 150 can check voltage drop across one or more LEDs in a loop. Alternatively or in addition, the light source fault sensor(s) 150 can check a current or power draw in that loop and compare it to a threshold current or power draw.

The vehicle 100 can include a plurality of light drivers 160, which may sometimes be referred to as light driver modules (LDMs). The light drivers 160 can be operatively connected between one or more power supplies 140 and the headlamp system 112 (or the low beam light sources 114 and/or the high beam light sources 116). The light drivers 160 can be configured to selectively supply electrical energy from the power supply 140 to the headlamp system 112. The light drivers 160 can be configured to convert electrical power from the power supply 140 to a form suitable for use by the low beam light sources 114 and/or the high beam light sources 116. As an example, the light drivers 160 can convert high voltage alternating current to low voltage direct current for use by LED light sources. The light drivers 160 can be configured to protect the LEDs from line-voltage fluctuations. The light drivers 160 can be configured to output electrical energy at a substantially constant voltage or a substantially constant current. In one or more arrangements, the light driver 160 can be configured to output electrical energy at a substantially constant current for which the light sources are rated.

In one or more arrangements, each of the plurality of light drivers 160 can be operatively connected to a group of the low beam light sources 114 and a group of the high beam light sources 116. In this context, a "group" means one or more but less than all of the respective light sources. Each of the light drivers 160 can be configured to selectively supply electrical energy at a predetermined power, voltage, and/or current. In one or more arrangements, the plurality of light drivers 160 can have the same ratings for power, voltage, and/or current output. In one or more arrangements, at least one of the light drivers 160 can have a different ratings for power, voltage, and/or current output from the other light drivers 160.

The vehicle 100 can include one or more switching elements 170. The switching elements 170 can be any suitable element that can make and break a connection in a circuit or that can divert current from one circuit element to another. As an example, the switching elements 170 can be transistors or other solid-state components. As another example, the switching elements 170 can be electro-mechanical switches. The switching elements 170 can have at least a first position and a second position. For instance, the first position can be an open position of a switch, or it can be an "off" position of a transistor. Further, the second position can be a closed position of a switch, or it can be an "on" position of a transistor. As will be described herein, the switching elements 170 can be provided in various suitable locations in a vehicle headlamp lighting circuit. The switching elements 170 can be operatively connected to the controller(s) 120.

One or more components, devices, or systems of the vehicle 100 can include one or more modules, at least some of which will be described herein. The modules can be implemented as computer readable program code that, when executed by a processor, implement one or more of the various processes described herein. One or more of the modules can be a component of the controller(s) 120, or one or more of the modules can be executed on and/or distributed among other processing systems to which the controller(s) 120 is operatively connected. The modules can include instructions (e.g., program logic) executable by one or more controller(s) 120. Alternatively or in addition, one or more data stores 130 may contain such instructions. In one or more arrangements, one or more of the modules can be distributed among a plurality of the modules described herein. In one or more arrangements, two or more of the modules described herein can be combined into a single module.

The vehicle 100 can include one or more high beam modules 180. In one or more arrangements, the high beam module(s) 180 can at least include one or more hardware components. The high beam module(s) 180 can be configured to activate the plurality of high beam light sources 116 and/or to cause the plurality of high beam light sources 116 to be activated. As used herein, "cause" or "causing" means to make, force, compel, direct, command, instruct, and/or enable an event or action to occur or at least be in a state where such event or action may occur, either in a direct or indirect manner. The high beam module(s) 180 can be operatively connected to receive signals from a vehicle occupant (e.g., a driver), the controller(s) 120, and/or other source to activate the high beam light sources 116.

The vehicle 100 can include one or more failsafe modules 190. In one or more arrangements, the failsafe module(s) 190 can at least include one or more hardware components. The failsafe module(s) 190 can be configured to ensure that light energy is emitted by the headlamp system 112 when a fault is detected with one or more light sources of the headlamp system 112. More particularly, the failsafe module(s) 190 can be configured to ensure that light energy is emitted by the headlamp system 112 when a fault is detected with one or more of the low beam light sources 114. The failsafe module(s) 190 can receive an input and/or data from the light source fault sensor(s) 150 and/or other sensor. Responsive to detecting a fault with one or more low beam light sources 114, the failsafe module(s) 190 can be configured to cause the low beam light sources 114, or at least a portion of the low beam light sources 114, to be bypassed. The failsafe module(s) 190 can be configured to cause the high beam light sources 116, or at least a portion of the high beam light sources 116, to be activated so as to emit light energy therefrom.

The various elements described above can be arranged in various suitable manners. The arrangements described herein can accommodate designs that cannot be handled by conventional LED headlamp systems. For instance, it may be desirable to have to power output and/or output of the high beam headlamp different from the output of the low beam headlamp. As a non-limiting example, it may be desirable to provide a low beam LED headlamp with a power output of 45 watts and a high beam LED headlamp with a power output of 35 watts. A single light driver may have a power output of 41 watts. When two light drivers are used, the total available output is 82 watts. Thus, even though the total power output of the headlamps is 80 watts, which is less than the total power output of two light drivers, the power output of the low beam exceeds the power output of a single light driver (i.e., 45 watts is greater than 41 watts). Thus, the conventional use of a light driver for the high beam and a separate light driver for the low beam will not accommodate this design. However, unless each light driver is providing the full 41 watts of their output to the respective low beam and high beam lamps, the light drivers will not be used to their full potential.

According to arrangements described herein, the light drivers can be used to their full potential. The first light driver and the second light driver can be configured to selectively provide electrical energy to power the plurality of low beam light sources and the plurality of high beam light sources in a commingled manner. "Power the low beam light sources and the high beam light sources in a commingled manner" means a state or act in which power from a first source is provided or capable of being provided to a portion of a plurality of low beam light sources and a portion of a plurality of high beam light sources and in which power from a second source is provided or capable of being provided to a remainder of the plurality of low beam light sources and a remainder of the plurality of high beam light sources.

Figure 2:
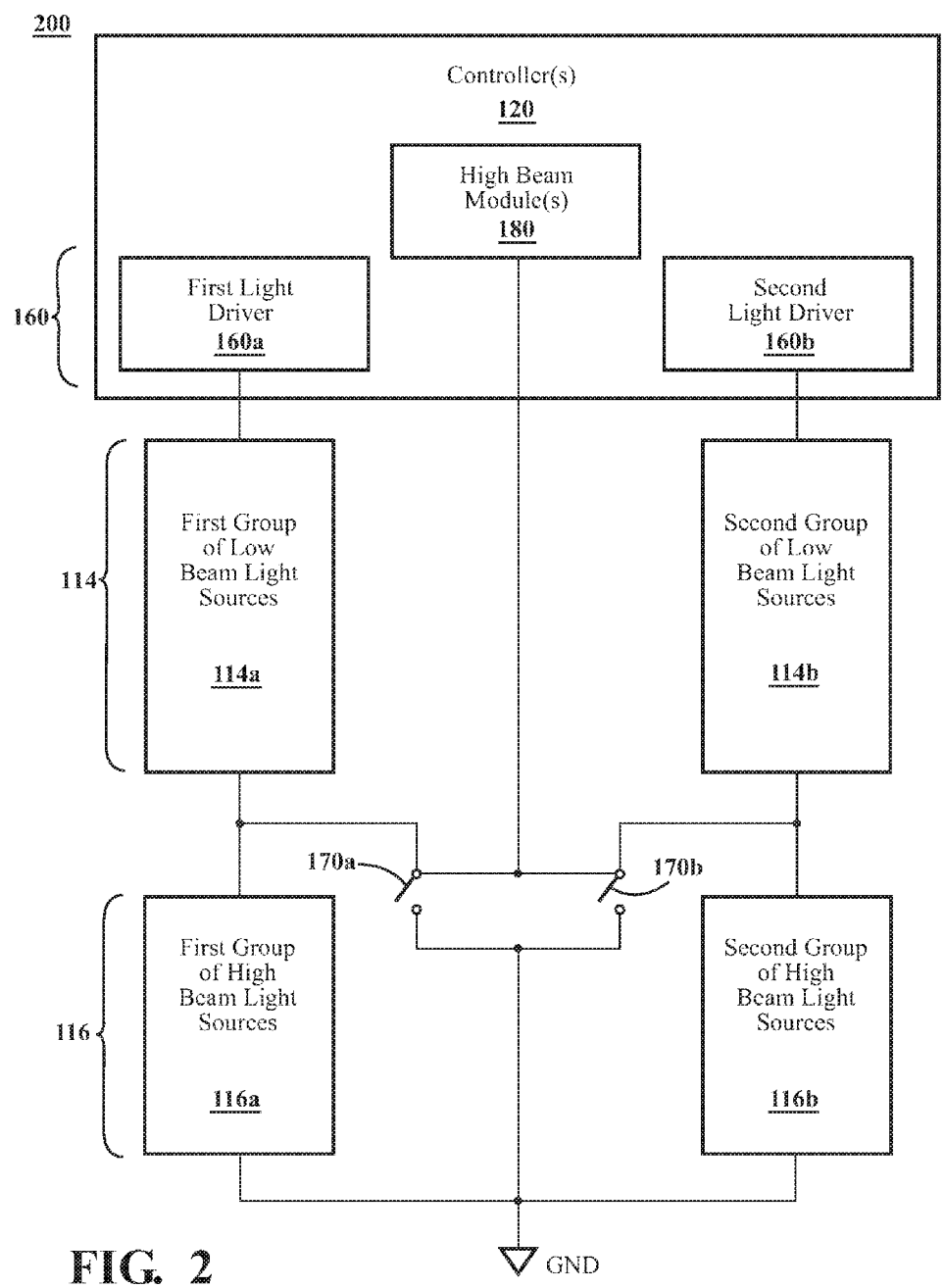
FIG. 2 is an example of a vehicle headlamp lighting circuit.

Referring to FIG. 2, one example of a vehicle headlamp lighting circuit 200 is shown. The vehicle headlamp lighting circuit 200 can be for use in connection with a single headlamp assembly. However, it will be appreciated that the vehicle headlamp lighting circuit 200 can be used for a plurality of vehicle headlamps. For example, in one or more arrangements, the vehicle headlamp lighting circuit 200 can be used for a right headlamp as well as for a left headlamp of the vehicle 100.

The vehicle headlamp lighting circuit 200 can include the controller(s) 120. The vehicle headlamp lighting circuit 200 can include the plurality of light drivers 160. For purposes of this example of the vehicle headlamp lighting circuit 200, the plurality of light drivers 160 includes a first light driver 160*a* and a second light driver 160*b*. The vehicle headlamp lighting circuit 200 can include the plurality of low beam light sources 114 and the plurality of high beam light sources 116. For purposes of this example of the vehicle headlamp lighting circuit 200, the low beam light sources 114 and the high beam light sources 116 can be made up of LEDs. More particularly, the plurality of low beam light sources 114 can include a plurality of LED chips, and the plurality of high beam light sources 116 can include a plurality of LED chips. As an example, each LED chip can include a plurality of individual LEDs. In one or more arrangements, at least the plurality of low beam light sources and the plurality of high beam light sources can be provided in a single headlamp assembly (e.g., a headlamp housing).

The plurality of low beam light sources 114 can have an associated power rating or output. In one or more arrangements, the low beam light sources 114 can have a power output of about 45 watts, although other power outputs may apply to the low beam light sources 114, and each low beam light source 114 may have a different output in comparison to the other low beam light sources 114.

The plurality of low beam light sources 114 can include a first group of low beam light sources 114*a* and a second group of low beam light sources 114*b*. The first group of low beam light sources 114*a* and the second group of low beam light sources 114*b* can include any suitable quantity of individual light sources. In one or more arrangements, the first group of low beam light sources 114*a* and the second group of low beam light sources 114*b* can have the same quantity of light sources. In one or more arrangements, the first group of low beam light sources 114*a* and the second group of low beam light sources 114*b* can have different quantities of light sources.

As non-limiting examples, in one or more arrangements, the first group of low beam light sources 114*a* can have 8 light sources (e.g. LEDs), and the second group of low beam light sources 114*b* can have 6 light sources (e.g., LEDs). As a further example, the first group of low beam light sources 114*a* can have 3 low beam LED chips, and the second group of low beam light sources 114*b* can have 2 low beam LED chips.

The first group of low beam light sources 114*a* can have an associated activation voltage, and the second group of low beam light sources 114*b* can have an associated activation voltage. In one or more arrangements, the first group of low beam light sources 114*a* and the second group of low beam light sources 114*b* can have substantially the same activation voltage. In one or more arrangements, the first group of low beam light sources 114*a* and the second group of low beam light sources 114*b* can have different associated activation voltages. As an example, in one or more arrangements, the first group of low beam light sources 114*a* can have an activation voltage of about 23.1 volts, and the second group of low beam light sources 114*b* can have an activation voltage of about 19.8 volts.

Figure 3:
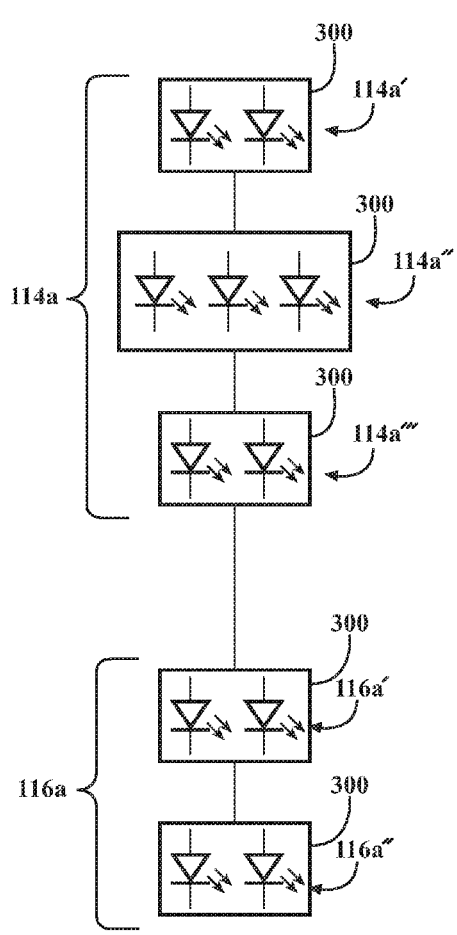
FIG. 3 is an example of a first group of low beam light sources and a first group of high beam light sources.

In one or more arrangements, the first group of low beam light sources 114*a* can include a plurality of subgroups of light sources. One example of such an arrangement is shown in FIG. 3. In one or more arrangements, the first group of low beam light sources 114*a* can include a first subgroup of low beam light sources 114*a*', a second subgroup of low beam light sources 114*a*", and a third subgroup of low beam light sources 114*a*'''. In one or more arrangements, each subgroup of low beam light sources 114*a*', 114*a*", 114*a*''' can be provided as a LED chip 300. In one or more arrangements, the LED chips of the first group of low beam light sources 114*a* may be serially connected, as is shown in FIG. 3.

The subgroups 114*a*', 114*a*", 114*a*''' can have any suitable quantity of light sources. In one or more arrangements, the subgroups 114*a*', 114*a*", 114*a*''' can have the same quantity of light sources. In one or more arrangements, the subgroups 114*a*', 114*a*", 114*a*''' can have different quantities of light sources. In one example, as is shown, the first subgroup of low beam light sources 114*a*' can have two light sources, the second subgroup of low beam light sources 114*a*" can include three light sources, and the third subgroup of low beam light sources 114*a*''' can include two light sources.

Each of the subgroups 114*a*', 114*a*", 114*a*''' can have any suitable characteristics. In one or more arrangements, the subgroups 114*a*', 114*a*", 114*a*''' can have the same characteristics. In one or more arrangements, the subgroups 114*a*', 114*a*", 114*a*''' can have different characteristics. As an example, the first subgroup of low beam light sources 114*a*' sources can have an activation voltage of about 6.6 volts, the second subgroup of low beam light sources 114*a*" can have an activation voltage of about 9.9 volts, and the third subgroup of low beam light sources 114*a*''' can have an activation voltage of about 6.6 volts.

Figure 4:
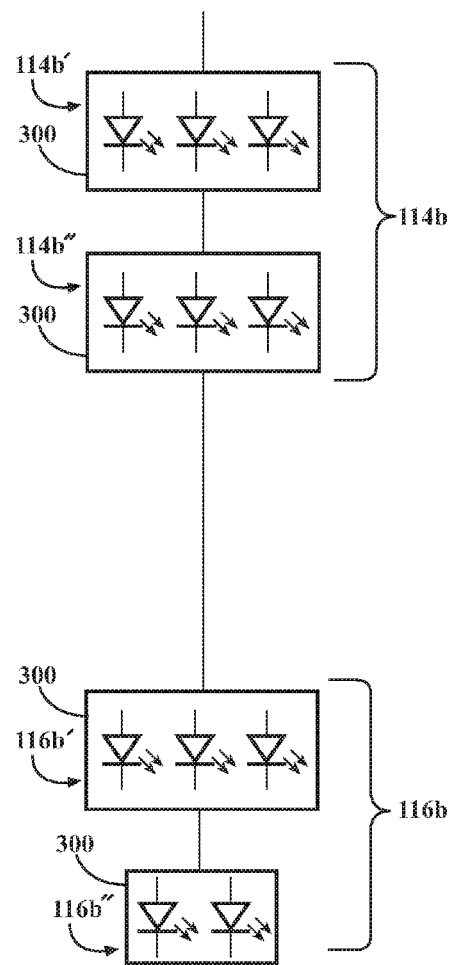
FIG. 4 is an example of a second group of low beam light sources and a second group of high beam light sources.

In one or more arrangements, the second group of low beam light sources 114*b* can include a plurality of subgroups of light sources. One example of such an arrangement is shown in FIG. 4. In one or more arrangements, the second group of low beam light sources 114b can include a fourth subgroup of low beam light sources 114b', and a fifth subgroup of low beam light sources 114b". In one or more arrangements, each subgroup of light sources 114b', 114b" can be provided as an LED chip 300. In one or more arrangements, the low beam LED chips of the second group of low beam light sources 114b may be serially connected, as is shown in FIG. 4.

The subgroups 114b', 114b" can have any suitable quantity of light sources. In one or more arrangements, the subgroups 114b', 114b" can have the same quantity of light sources. In one or more arrangements, the subgroups 114b', 114b" can have different quantities of light sources. In one example, as is shown, the fourth subgroup of low beam light sources 114b' can have three light sources, and the fifth subgroup of low beam light sources 114b" can include three light sources.

Each of the subgroups 114b', 114b" can have any suitable characteristics. In one or more arrangements, the subgroups 114b', 114b" can have the same characteristics. In one or more arrangements, subgroups 114b', 114b" can have different characteristics. As an example, the fourth subgroup of low beam light sources can have an activation voltage of about 9.9 volts, and the fifth subgroup of low beam light sources can have an activation voltage of about 9.9 volts.

The plurality of high beam light sources 116 can have an associated power output. In one or more arrangements, the high beam light sources 116 can have a power output of about 35 watts.

The plurality of high beam light sources 116 can include a first group of high beam light sources 116a and a second group of high beam light sources 116b. The first group of high beam light sources 116a and the second group of high beam light sources 116b can include any suitable quantity of individual light sources. In one or more arrangements, the first group of high beam light sources 116a and the second group of high beam light sources 116b can include the same quantity of light sources. In one or more arrangements, the first group of high beam light sources 116a and the second group of high beam light sources 116b can have different quantities of light sources. As a non-limiting example, in one or more arrangements, the first group of high beam light sources 116a can have about 4 light sources (e.g., LEDs), and the second group of high beam light sources 116b can have 5 light sources (e.g., LEDs). As a further example, the first group of high beam light sources 116a can have 2 high beam LED chips, and the second group of high beam light sources 116b can have 2 high beam LED chips. In one or more arrangements, the high beam LED chips of the first group of high beam light sources 116a may be serially connected, and the high beam LED chips of the second group of high beam light sources 116b may also be serially connected.

The first group of high beam light sources 116a can have an associated activation voltage, and the second group of high beam light sources 116b can have an associated activation voltage. In one or more arrangements, the first group of high beam light sources 116a and the second group of high beam light sources 116b can have substantially the same activation voltage. In one or more arrangements, the first group of high beam light sources 116a and the second group of high beam light sources 116b can have different activation voltages. As an example, in one or more arrangements, the first group of high beam light sources 116a can have an activation voltage of about 13.2 volts, and the second group of high beam light sources 116b can have an activation voltage of about 16.5 volts.

In one or more arrangements, the first group of high beam light sources 116a can include a plurality of subgroups of light sources. One example of such an arrangement is shown in FIG. 3. In one or more arrangements, the first group of high beam light sources 116a can include a first subgroup of high beam light sources 116a' and a second subgroup of high beam light sources 116a". In one or more arrangements, each subgroup of high beam light sources 116a', 116a" can be provided as a LED chip 300. In one or more arrangements, the LED chips 300 of the first group of high beam light sources 116a may be serially connected, as is shown in FIG. 3.

The subgroups 116a', 116a" can have any suitable quantity of light sources. In one or more arrangements, the subgroups 116a', 116a" can have the same quantity of light sources. In one or more arrangements, the subgroups 116a', 116a" can have different quantities of light sources. In one example, as is shown, the first subgroup of high beam light sources 116a' can have two light sources, and the second subgroup of high beam light sources 116a" can include two light sources. The first subgroup of high beam light sources 116a' can have an activation voltage of about 6.6 volts, and the second subgroup of high beam light sources 116a" can have an activation voltage of about 6.6 volts.

In one or more arrangements, the second group of high beam light sources 116b can include a plurality of subgroups of light sources. One example of such an arrangement is shown in FIG. 4. In one or more arrangements, the second group of high beam light sources 116b can include a third subgroup of high beam light sources 116b' and a fourth subgroup of high beam light sources 116b". In one or more arrangements, each subgroup of high beam light sources 116b', 116b" can be provided as an LED chip 300. In one or more arrangements, the LED chips 300 of the second group of high beam light sources 116b may be serially connected, as is shown in FIG. 4.

The subgroups 116b', 116b" can have any suitable quantity of light sources. In one or more arrangements, the subgroups 116b', 116b" can have the same quantity of light sources. In one or more arrangements, the subgroups 114b', 114b" can have different quantities of light sources. In one example, as is shown, the third subgroup of high beam light sources 116b' can include three light sources, and the fourth subgroup of high beam light sources 116b" can include two light sources.

Each of the subgroups 116b', 116b" can have any suitable characteristics. In one or more arrangements, the subgroups 116b', 116b" can have the same characteristics. In one or more arrangements, the subgroups 116b', 116b" can have different characteristics. As an example, the third subgroup of high beam light sources 116b' can have an activation voltage of about 9.9 volts, and the fourth subgroup of high beam light sources 116b" can have an activation voltage of about 6.6 volts.

As noted above, the vehicle headlamp lighting circuit 200 can include a first light driver 160a and a second light driver 160b. The first light driver 160a and a second light driver 160b can have an associated power output. In one or more arrangements, the first light driver 160a can be configured to provide a first power output, and the second light driver 160b can be configured to provide a second power output. In one or more arrangements, the first power output can be substantially identical to the second power output. For example, the first power output and the second power output can be about 41 watts, though other power output values may apply. In one or more arrangements, the first power output and the second power output can be different.

The first light driver 160a can be operatively connected to a portion of the plurality of low beam light sources 114 and a portion of the plurality of high beam light sources 116. For instance, in one or more arrangements, the first light driver 160a can be operatively connected to the first group of the low beam light sources 114a and the first group of the high beam light sources 116a, as is shown in FIG. 2. The first group of low beam light sources 114a and the first group of the high beam light sources 116a can be connected in series. The first group of high beam light sources 116a can be operatively connected to ground. In one or more arrangements, the second light driver 160b can be operatively connected to the second group of low beam light sources 114b and the second group of high beam light sources 116b, as is shown in FIG. 2. The second group of low beam light sources 114b and the second group of the high beam light sources 116b can be connected in series. The second group of high beam light sources 116b can be operatively connected to ground.

The vehicle headlamp lighting circuit 200 can include the plurality of switching elements 170. For instance, the vehicle headlamp lighting circuit 200 can include a first switching element 170a and a second switching element 170b. As an example, the first switching element 170a and/or the second switching element 170b can be transistors. The first switching element 170a and the second switching element 170b can be operatively connected to receive control signals from the controller(s) 120 and/or the high beam module(s) 180. In one or more arrangements, the first switching element 170a and the second switching element 170b can be the same type of switch. In one or more arrangements, the first switching element 170a and the second switching element 170b can be different types of switches. The first switching element 170a and the second switching element 170b can have at least a first position and a second position. For purposes of this example, the first switching element 170a and the second switching element 170b are transistors, and the first position is an "off" position and the second position is an "on" position of the transistor.

In one or more arrangements, the first switching element 170a and the second switching element 170b can be selectively operated independently of each other. In one or more arrangements, the first switching element 170a and the second switching element 170b can be selectively operated in a coordinated manner with each other. In such case, the first switching element 170a and the second switching element 170b are kept in the same position.

The first switching element 170a can be operatively positioned between the first group of low beam light sources 114a and the first group of high beam light sources 116a. "Operatively positioned between" includes a positioning in which the operation or state of the positioned subject affects or controls the operation or state of one or more other components. The first switching element 170a can be operatively connected in branched relation between the first group of low beam light sources 114a and the first group of high beam light sources 116a, as is shown in FIG. 2. The second switching element 170b can be operatively positioned between the second group of low beam light sources 114b and the second group of high beam light sources 116b. The second switching element 170b can be operatively connected in branched relation between the second group of low beam light sources 114b and the second group of high beam light sources 116b. The first switching element 170a and the second switching element 170b can be operatively connected to ground.

The vehicle headlamp lighting circuit 200 can have a low beam operational mode and a high beam operational mode. The low beam operational mode can be implemented when it is desired to only operate the low beam headlamps 113. The high beam operational mode can be implemented when it is desired to activate the high beam headlamps 115. In at least some implementations of the high beam operational mode, the low beam headlamps 113 can be activated in addition to the high beam headlamps 115.

In the low beam operational mode, the first switching element 170a and the second switching element 170b can be maintained in or switched to the second position (e.g., the "on" position for a transistor). In the high beam operational mode, the first switching element 170a and the second switching element 170b can be maintained in or switched to the first position (e.g., the "off" position for a transistor). The controller(s) 120 and/or the high beam module(s) 180 can send signals to the first switching element 170a and the second switching element 170b to cause such positions to be implemented.

An example of a manner of operation of the vehicle headlamp lighting circuit 200 will now be described. A signal to operate the headlamp system 112 can be received. In some instances, the signal can be a signal to activate the low beam operational mode. In such case, the controller(s) 120 and/or the high beam module(s) 180 can be configured to cause the first switching element 170a and the second switching element 170b to be maintained in or switched to the second position (e.g., the "on" position for a transistor). In such case, the first light driver 160a can supply electrical energy to the first group of low beam light sources 114a. Due to the first switching element 170a being in the second position, the electrical current will flow to ground instead of the first group of high beam light sources 116a. In this way, the first group of high beam light sources 116a can be bypassed. Further, the second light driver 160b can supply electrical energy to the second group of low beam light sources 114b. Due to the second switching element 170b being in the second position, the electrical current will flow to ground instead of the second group of high beam light sources 116b. In this way, the second group of high beam light sources 116b can be bypassed. As a result of such arrangements, the low beam light sources 114 of the low beam headlamp 113 can be activated while the high beam light sources 116 of the high beam headlamp 115 are not activated.

In some instances, the signal to operate the headlamp system 112 can be a signal to activate the high beam operational mode. In such case, the controller(s) 120 and/or the high beam module(s) 180 can be configured to cause the first switching element 170a and the second switching element 170b to be maintained in or switched to the first position (e.g., the "off" position for a transistor). In such case, the first light driver 160a can supply electrical energy to the first group of low beam light sources 114a. Due to the first switching element 170a being in the first position, the electrical current will flow in series through the first group of low beam light sources 114a, the first group of high beam light sources 116a, and then to ground. Further, the second light driver 160b can supply electrical energy to the second group of low beam light sources 114b. Due to the second switching element 170b being in the first position, the electrical current will flow in series through the second group of low beam light sources 114a, the second group of high beam light sources 116b, and then to ground. As a result of such arrangements, the low beam headlamp 113 and the high beam headlamp 115 are both activated.

It will be appreciated that the total power output of the first light driver 160a can be equal to or greater than the sum of the power output by the first group of low beam light sources 114a and the power output by the first group of high beam light sources 116a. Further, the total power output of the second light driver 160b can be greater than the sum of the power output by the second group of low beam light sources 114b and the power output by the second group of high beam light sources 116b. In one or more arrangements, the total power output of each of the first light driver 160a and the second light driver 160b can be about 41 watts. In one or more arrangements, the sum of the power output by the first group of low beam light sources 114a and the power output by the first group of high beam light sources 116a can be about 40 watts. In one or more arrangements, the sum of the power output by the second group of low beam light sources 114b and the power output by the second group of high beam light sources 116b can be about 40 watts. Such an arrangement could not be received if the first light driver 160a were conventionally providing power to all the low beam light sources 114, as the maximum power output of the low beam light sources 114 would exceed that of the first light driver 160a.

Figure 5:
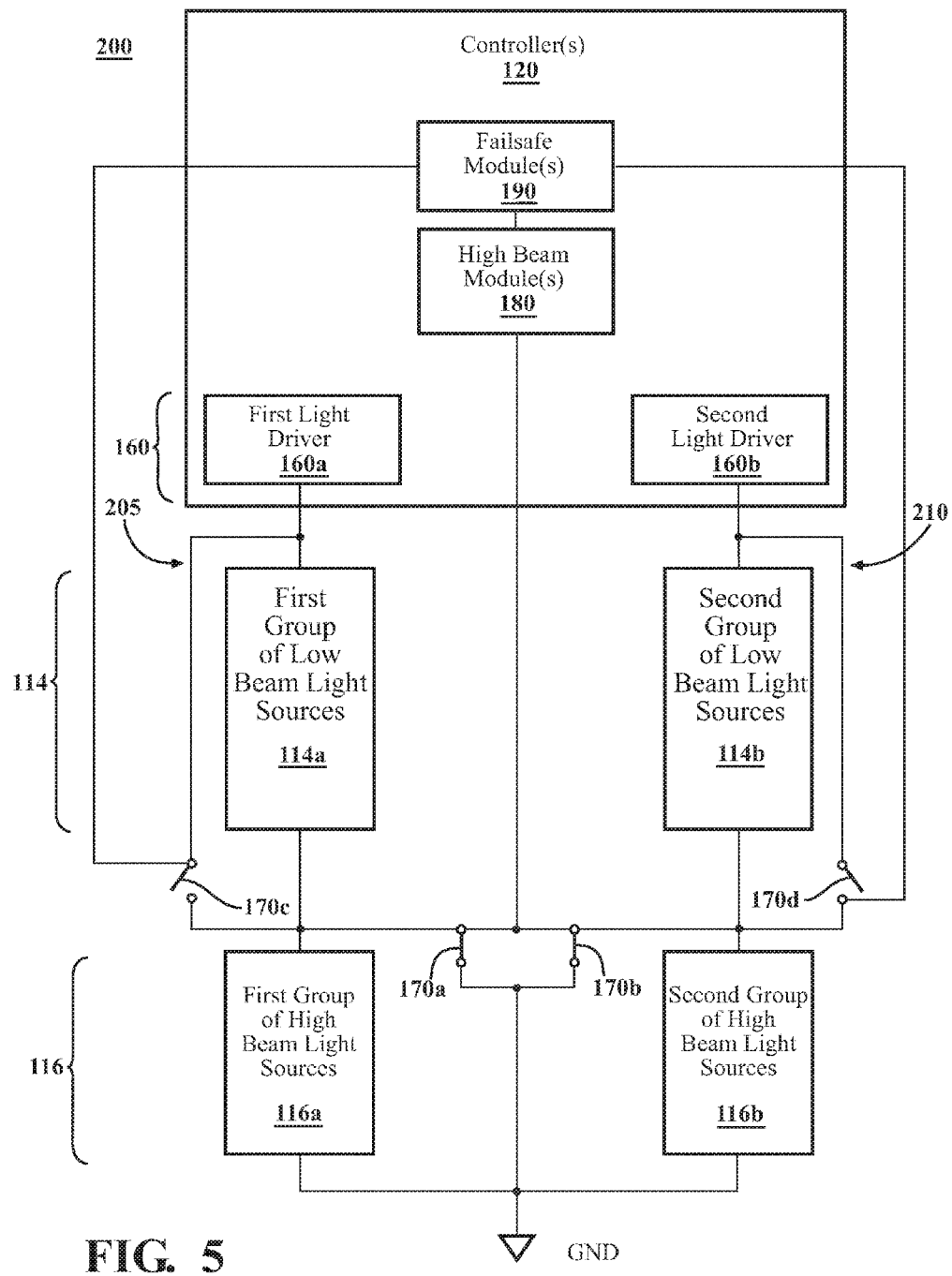
FIG. 5 is an example of a vehicle headlamp lighting circuit configured to provide a failsafe operational mode.

The hybrid design of the vehicle headlamp lighting circuit 200 that provides a more efficient power distribution can also enable one or more failsafe features. The vehicle headlamp lighting circuit 200 can be configured to provide a failsafe operational mode in the event that a fault of one or more of the plurality of low beam light sources 114 is detects. Such a fault can, in turn, disrupt the supply of electrical energy to the plurality of high beam light sources 116. One example of the vehicle headlamp lighting circuit 200 configured to provide a failsafe operational mode is shown in FIG. 5. The above discussion of the vehicle headlamp lighting circuit 200 in FIG. 2 applies equally to the vehicle headlamp lighting circuit 200 in FIG. 5. Therefore, only the additional features will be described here.

The vehicle headlamp lighting circuit 200 can include the light source fault sensor(s) 150 (not shown in FIG. 5). The light source fault sensor(s) 150 can be operatively connected and/or operatively positioned to detect a fault in one or more of the low beam light sources 114 or to acquire data so that such a determination can be made, such as by the controller(s) 120 and/or the failsafe module(s) 190, as to whether there is a fault in one or more of the low beam light sources 114.

The vehicle headlamp lighting circuit 200 can include a first bypass 205 and a second bypass 210. The first bypass 205 can be connected in parallel to the first group of low beam light sources 114a. A third switching element 170c can be operatively connected along the first bypass 205. The second bypass 210 can be connected in parallel to the second group of low beam light sources 114b. A fourth switching element 170d can be operatively connected along the second bypass 210.

The vehicle headlamp lighting circuit 200 can include the failsafe module(s) 190. The failsafe module(s) 190 can be operatively connected to light source fault sensor(s) 150. The light source fault sensor(s) 150 and/or the failsafe module(s) 190 can detect whether there is a fault with one or more of the low beam light sources 114 (e.g., an individual light source, LED chip, etc.). If a fault of one or more of the low beam light sources 114 is detected, the failsafe module(s) 190 can cause the third switching element 170c and/or the fourth switching element 170d to be maintained in or switched to the second position (e.g., the "on" position for a transistor or a closed position for a switch). In addition, the failsafe module(s) 190 and/or the high beam module(s) 180 can cause the first switching element 170a and the second switching element 170b to be switched to the first position (e.g., the "off" position for a transistor or an open position for a switch).

In such case, electrical energy may flow from the first light driver 160a to the first bypass 205, and electrical energy may flow from the second light driver 160b to the second bypass 210. Since the third switching element 170c and/or the fourth switching element 170d are in the second position, electrical current may flow through the first bypass 205 to the first group of high beam light sources 116a and then to ground. Likewise, electrical current may flow through the second bypass 210 to the second group of high beam light sources 116b and then to ground. Thus, it will be appreciated that the low beam light sources 114 are bypassed, but the headlamp system 112 may continue to provide light output in the event of the failure of the low beam light sources 114.

In one or more arrangements, the third switching element 170c and the fourth switching element 170d can be operated independently of each other. If a fault is detected with, for example, one or more of the first group of low beam light sources 114a, but not one or more of the second group of low beam light sources 114b, the failsafe module(s) 190 can cause the third switching element 170c to be maintained in or switched to the second position (e.g., the "on" position for a transistor or a closed position for a switch) and can cause the fourth switching element 170d to be maintained in or switched to the first position (e.g., the "off" position for a transistor or an open position for a switch). In addition, the failsafe module(s) 190 and/or the high beam module(s) 180 can cause the first switching element 170a to be maintained in or switched to the first position and can cause the second switching element 170b to be maintained in or switched to the second position. In such case, the first group of low beam light sources 114a can be bypassed, but the second group of low beam light sources 114b is activated. At least the first group of high beam light sources 116a can be activated.

In one or more arrangements, the third switching element 170c and the fourth switching element 170d can be operated in a coordinated manner with each other. If a fault is detected in, for example, one or more of the first group of low beam light sources 114a, but not one or more of the second group of low beam light sources 114b, the failsafe module(s) 190 can cause both the third switching element 170c and the fourth switching element 170d to be maintained in or switched to the second position (e.g., the "on" position for a transistor or a closed position for a switch). In addition, the failsafe module(s) 190 and/or the high beam module(s) 180 can cause the first switching element 170a and the second switching element 170b to be maintained in or switched to the first position. In such case, the low beam light sources 114a can be bypassed, even though a fault was detected with only one of the groups of low beam light sources 114a, 114b. The first and second group of high beam light sources 116a, 116b can be activated.

If a fault of one or more of the low beam light sources 114 is not detected or is no longer detected if the fault is corrected, the failsafe module(s) 190 can cause the third switching element 170c and/or the fourth switching element 170d to remain in or be switched to the first position (e.g., the "off" position for a transistor or an open position for a switch). The high beam module(s) 180 can control the first switching element 170a and the second switching element 170b as described above in connection with FIG. 2.

In such case, electrical energy may not flow from the first light driver 160a through the first bypass 205 due to the third switching element 170c being in the first position, and electrical energy may not flow from the second light driver 160b through the second bypass 210 due to the fourth switching element 170d being in the first position. Electrical current may flow through the low beam light sources 114 and/or the high beam light sources 116, as described above in connection with FIG. 2, depending on the position of the first switching element 170a and the second switching element 170b.

The failsafe module(s) 190 and/or the high beam module(s) 180 can be operatively connected with each other to avoid short circuits. For example, the failsafe module(s) 190 and/or the high beam module(s) 180 can coordinate with each other so that the first switching element 170a is not in the second position at the same time that the third switching element 170c is in the second position. Similarly, the failsafe module(s) 190 and/or the high beam module(s) 180 can coordinate with each other so that the second switching element 170b is not in the second position at the same time that the fourth switching element 170d is in the closed position. Thus, if the failsafe mode is implemented, the first switching element 170a can be set to the first position before the third switching element 170c is set to the second position, and/or the second switching element 170b can be set to the first position before the fourth switching element 170d is set to the second position.

Now that the various potential systems, devices, elements and/or components have been described, various methods of operating a vehicle headlamp will now be described. Referring now to FIG. 6, an example of a method of operating a vehicle headlamp system is shown. The vehicle headlamp system including a plurality of low beam light sources 114 and a plurality of high beam light sources 116.

Various possible steps of method 400 will now be described. The method 400 illustrated in FIG. 6 may be applicable to the embodiments described above in relation to FIGS. 1-5, but it is understood that the method 400 can be carried out with other suitable systems and arrangements. Moreover, the method 400 may include other steps that are not shown here, and in fact, the method 400 is not limited to including every step shown in FIG. 6. The steps that are illustrated here as part of the method 400 are not limited to this particular chronological order. Indeed, some of the steps may be performed in a different order than what is shown and/or at least some of the steps shown can occur simultaneously.

At block 410, a signal for operating the headlamp system 112 can be received. The signal can be a signal to operate the headlamp system 112 in a low beam operational mode or in a high beam operational mode. The signal can be received by, for example, the controller(s) 120. The signal can be received from any suitable source, such as the controller(s) 120, an occupant (e.g., a driver) of the vehicle 100 through a human-machine interface, automatically based on a detected condition (e.g., it is sufficiently dark outside, the vehicle is started, etc.) or some other criteria, and/or from any other suitable source. The method 400 can continue to block 420.

At block 420, responsive to the received signal being for the low beam operational mode, electrical energy can be caused, such as by the first light driver 160a and/or the controller(s) 120, to be supplied to a first group of low beam light sources 114a while bypassing a first group of high beam light sources 116a. Electrical energy can be caused, such as by the second light driver 160b and/or the controller(s) 120, to be supplied to a second group of low beam light sources 114b while bypassing a second group of high beam light sources 116b. In this way, the plurality of low beam light sources 114 can be activated (e.g., remain activated or become activated) while the plurality of high beam light sources 116 are not activated (e.g., remain deactivated or become deactivated). The method 400 can continue to block 430.

At block 430, responsive to the received signal being for the high beam operational mode, electrical energy can be caused to be supplied the first group of low beam light sources and the first group of high beam light sources in series and causing a second light driver to supply electrical energy to the second group of low beam light sources and the second group of high beam light sources in series, whereby the plurality of low beam light sources are activated and the plurality of high beam light sources are activated.

The method 400 can end. Alternatively, the method 400 can return to block 410 or some other block. As a further alternative, the method 400 can include additional and/or alternative blocks. For instance, the method 400 can include detecting whether there is a fault in one or more of the plurality of low beam light sources 114. Such detecting can be performed by one or more elements, such as the light source fault sensor(s) 150 and/or the controller(s) 120. In such case, the failsafe mode can be implemented. Thus, the method 400 can also include, responsive to detecting a fault in one or more of the plurality of light sources, electrical energy can be caused, such as by the failsafe module(s) 190, the first light driver 160a, and/or the controller(s) 120, to be supplied to the first group of high beam light sources 116a while bypassing the first group of low beam light sources 114a. Further, electrical energy can be caused, such as by the failsafe module(s) 190, the second light driver 160b, and/or the controller(s) 120, to be supplied to the second group of high beam light sources 116b while bypassing the second group of low beam light sources 114b. Thus, the plurality of low beam light sources 114 are not activated and the plurality of high beam light sources 116 are activated. In this way, continued light output from the headlamp system 112 can be maintained.

It will be appreciated that arrangements described herein can provide numerous benefits, including one or more of the benefits mentioned herein. For example, arrangements described herein can allow flexibility in the design and/or selection of the power output of LED headlamps (separate high beam and low beam) while minimizing the quantity of light drivers used. Arrangements described herein can use the full potential of multiple light drivers, while additionally allowing for the use of a high beam or low beam output that exceeds the power provided by a single light driver. Arrangements described herein can avoid the output of the high beam and low beam lamps being limited to the maximum output of the respective light driver. Arrangements described herein can provide the capability of driving both the low beam headlamps and the high beam headlamps without requiring additional power output from additional light drivers.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle lighting system comprising:
a plurality of low beam light sources including a first group of low beam light sources and a second group of low beam light sources;
a plurality of high beam light sources including a first group of high beam light sources and a second group of high beam light sources;
a first light driver operatively connected to the first group of low beam light sources and the first group of high beam light sources;
a second light driver operatively connected to the second group of low beam light sources and a second group of high beam light sources; and
a controller operatively connected to the first light driver and the second light driver, the controller being configured to:
cause the first light driver to selectively supply electrical energy to at least one of the first group of low beam light sources or the first group of high beam light sources, and
cause the second light driver to selectively supply electrical energy to at least one of the second group of low beam light sources or the second group of high beam light sources.

2. The vehicle lighting system of claim 1, wherein the controller is further configured to operate the first light driver and the second light driver in a low beam operational mode, wherein, in the low beam operational mode:
the first light driver selectively supplies electrical energy to the first group of low beam light sources while bypassing the first group of high beam light sources, whereby the first group of low beam light sources are activated and the first group of high beam light sources are not activated, and
the second light driver selectively supplies electrical energy to the second group of low beam light sources while bypassing the second group of high beam light sources, whereby the second group of low beam light sources are activated and the second group of high beam light sources are not activated.

3. The vehicle lighting system of claim 2, wherein the controller is further configured to operate the first light driver and the second light driver in a high beam operational mode, wherein, in the high beam operational mode:
the first light driver selectively supplies electrical energy to the first group of low beam light sources and the first group of high beam light sources in series, whereby the first group of low beam light sources are activated and the first group of high beam light sources are activated; and
the second light driver selectively supplies electrical energy to the second group of low beam light sources and the second group of high beam light sources in series, whereby the second group of low beam light sources are activated and the second group of high beam light sources are activated.

4. The vehicle lighting system of claim 3, further including:
a first switching element operatively positioned between the first group of low beam light sources and the first group of high beam light sources; and
a second switching element operatively positioned between the second group of low beam light sources and the second group of high beam light sources,
wherein the controller is operatively connected to the first switching element and the second switching element,
wherein, in the low beam operational mode, the controller causes the first switching elements to be set to a position to allow electrical energy from the first light driver to be provided to the first group of low beam light sources while bypassing the first group of high beam light sources, and wherein the controller causes the second switching element to be set to a position to allow electrical energy from the second light driver to be provided to the second group of low beam light sources while bypassing the second group of high beam light sources.

5. The vehicle lighting system of claim 4, wherein the first switching element is a transistor, and wherein the second switching element is a transistor.

6. The vehicle lighting system of claim 1, wherein the plurality of low beam light sources are light emitting diodes, and wherein the plurality of high beam light sources are light emitting diodes.

7. The vehicle lighting system of claim 1, wherein the first light driver is configured to supply electrical energy at an associated first power output, wherein the first group of low beam light sources has an associated power output, wherein the first group of high beam light sources has an associated power output, and wherein the first power output is greater than or equal to the sum of the power output by the first group of low beam light sources and the power output by the first group of high beam light sources, and
wherein the second light driver is configured to supply electrical energy at an associated second power output, wherein the second group of low beam light sources has an associated power output, wherein the second group of high beam light sources has an associated power output, and wherein the second power output is greater than or equal to the sum of the power output by the second group of low beam light sources and the power output by the second group of high beam light sources.

8. The vehicle lighting system of claim 7, wherein the first power output is substantially equal to the second power output.

9. The vehicle lighting system of claim 1, further including:
a light source fault sensor configured to detect a fault in one or more of the plurality of low beam light sources, wherein the light source fault sensor is operatively connected to the controller.

10. The vehicle lighting system of claim 9, wherein the controller is further configured to:
responsive to detecting a fault with one or more of the plurality of low beam light sources, cause the first light driver to supply electrical energy to the first group of high beam light sources while bypassing the first group of low beam light sources, and cause the second light driver to supply electrical energy to the second group of high beam light sources while bypassing the second group of low beam light sources, whereby the plurality of high beam light sources are activated and the plurality of low beam light sources are not activated.

11. The vehicle lighting system of claim 1, wherein at least the plurality of low beam light sources and the plurality of high beam light sources are provided in a single headlamp assembly.

12. A vehicle headlamp system comprising:
a plurality of low beam LEDs;
a plurality of high beam LEDs;
the plurality of low beam LEDs and the plurality of high beam LEDs being a part of a light source for a single headlamp assembly;
a first light driver;
a second light driver; and
the first light driver and the second light driver being configured to selectively provide electrical energy to power the plurality of low beam LEDs and the plurality of high beam LEDs in a commingled manner.

13. The vehicle headlamp system of claim 12, wherein the plurality of low beam LEDs includes a first group of low beam LEDs and a second group of low beam LEDs, wherein the plurality of high beam LEDs includes a first group of high beam LEDs and a second group of high beam LEDs, wherein the light source includes a low beam operational mode, and wherein, in the low beam operational mode:
the first light driver selectively provides electrical energy to the first group of low beam LEDs while bypassing the first group of high beam LEDs,
the second light driver selectively provides electrical energy to the second group of low beam LEDs while bypassing the second group of high beam LEDs,
whereby the plurality of low beam LEDs are activated and the plurality of high beam LEDs are not activated.

14. The vehicle headlamp system of claim 12, wherein the plurality of low beam LEDs includes a first group of low beam LEDs and a second group of low beam LEDs, wherein the plurality of high beam LEDs includes a first group of high beam LEDs and a second group of high beam LEDs, wherein the light source includes a high beam operational mode, and wherein, in the high beam operational mode:
the first light driver selectively provides electrical energy to the first group of low beam LEDs and the first group of high beam LEDs,
the second light driver selectively provides electrical energy to the second group of low beam LEDs and the second group of high beam LEDs,
whereby the plurality of low beam LEDs are activated and the plurality of high beam LEDs are activated.

15. The vehicle headlamp system of claim 12, wherein the plurality of low beam LEDs includes a first group of low beam LEDs and a second group of low beam LEDs, wherein the plurality of high beam LEDs includes a first group of high beam LEDs and a second group of high beam LEDs,
wherein the first light driver is configured to supply electrical energy at an associated first power output, wherein the first group of low beam LEDs has an associated power output, wherein the first group of high beam LEDs has an associated power output, and wherein the first power output is greater than or equal to the sum of the power output by the first group of low beam LEDs and the power output by the first group of high beam LEDs, and
wherein the second light driver is configured to supply electrical energy at an associated second power output, wherein the second group of low beam LEDs has an associated power output, wherein the second group of high beam LEDs has an associated power output, and wherein the second power output is greater than or equal to the sum of the power output by the second group of low beam LEDs and the power output by the second group of high beam LEDs.

16. The vehicle headlamp system of claim 12, further including:

a light source fault sensor configured to detect a fault in one or more of the plurality of low beam LEDs; and
a controller operatively connector the light source fault sensor, wherein the controller is operatively connected to the first light driver and the second light driver.

17. The vehicle headlamp system of claim 16, wherein the controller is further configured to:
responsive to detecting a fault with one or more of the plurality of low beam LEDs, cause, using the controller, the first light driver and the second light driver to supply electrical energy to the plurality of high beam LEDs while bypassing the low beam LEDs, whereby the plurality of high beam LEDs are activated and the plurality of low beam LEDs are not activated.

18. A method of operating a vehicle headlamp system, the vehicle headlamp system including a plurality of low beam light sources and a plurality of high beam light sources, the method comprising:
receiving a signal to operate the vehicle headlamp system in one of a low beam operational mode or a high beam operational mode;
responsive to the received signal being a signal to operate the vehicle headlamp system in the low beam operational mode, causing, using a controller, a first light driver to supply electrical energy to a first group of low beam light sources while bypassing a first group of high beam light sources, and causing, using the controller, a second light driver to supply electrical energy to a second group of low beam light sources while bypassing a second group of high beam light sources, whereby the plurality of low beam light sources are activated and the plurality of high beam light sources are not activated; and
responsive to the signal being a signal to operate the vehicle headlamp system in the high beam operational mode, causing, using the controller, the first light driver to supply electrical energy to the first group of low beam light sources and the first group of high beam light sources in series, and causing, using the controller, the second light driver to supply electrical energy to the second group of low beam light sources and the second group of high beam light sources in series, whereby the plurality of low beam light sources are activated and the plurality of high beam light sources are activated.

19. The method of claim 18, further including:
detecting whether there is a fault in one or more of the plurality of low beam light sources; and
responsive to detecting a fault with one or more of the plurality of low beam light sources, causing, using the controller, the first light driver to supply electrical energy to a first group of high beam light sources while bypassing a first group of low beam light sources, and causing, using a controller, the second light driver to supply electrical energy to a second group of high beam light sources while bypassing the second group of low beam light sources, whereby the plurality of high beam light sources are activated and the plurality of low beam light sources are not activated.

20. The method of claim 18, wherein the first light driver supplies electrical energy at an associated first power output, wherein the first group of low beam light sources has an associated power output, wherein the first group of high beam light sources has an associated power output, and wherein the first power output is greater than or equal to the sum of the power output by the first group of low beam light sources and the power output by the first group of high beam light sources, and wherein the second light driver supplies electrical energy at an associated second power output, wherein the second group of low beam light sources has an associated power output, wherein the second group of high beam light sources has an associated power output, and wherein the second power output is greater than or equal to the sum of the power output by the second group of low beam light sources and the power output by the second group of high beam light sources.

* * * * *